(12) United States Patent
Paasche et al.

(10) Patent No.: US 6,827,403 B2
(45) Date of Patent: Dec. 7, 2004

(54) GEAR-LOCK ADJUSTABLE SEAT STRUCTURE (75) Inventors: Gerhard Paasche, Scappoose, OR (US); Michael R. Dennis, Scappoose, OR (US)

(73) Assignee: MJD Innovations, L.L.C., Scappoose, OR (US)

(*) Notice: Subject to any disclaimer, the term of this patent is extended or adjusted under 35 U.S.C. 154(b) by 0 days.

(21) Appl. No.: 10/426,096

(22) Filed: Apr. 29, 2003

(65) Prior Publication Data

US 2004/0217637 A1 Nov. 4, 2004

(51) Int. Cl.[7] .............................. B60N 2/235
(52) U.S. Cl. ...................... 297/366; 297/367
(58) Field of Search ................. 297/367, 366

(56) References Cited

U.S. PATENT DOCUMENTS

| | | | | |
|---|---|---|---|---|
| 3,901,100 A | * | 8/1975 | Iida et al. ............... | 297/367 X |
| 3,902,757 A | * | 9/1975 | Yoshimura ............... | 297/367 |
| 4,146,267 A | * | 3/1979 | Mori et al. .............. | 297/367 |
| 4,295,682 A | * | 10/1981 | Kluting et al. ........... | 297/367 |
| 4,314,729 A | * | 2/1982 | Klueting ................. | 297/366 |
| 4,355,846 A | * | 10/1982 | Kluting et al. ........... | 297/366 |
| 4,406,497 A | * | 9/1983 | Kluting ................. | 297/366 |
| 4,456,300 A | * | 6/1984 | Kluting et al. ........... | 297/366 |
| 4,541,672 A | * | 9/1985 | Fukuta et al. ............ | 297/367 |
| 4,591,207 A | * | 5/1986 | Nithammer et al. ........ | 297/366 |
| 4,627,656 A | * | 12/1986 | Gokimoto et al. ......... | 297/366 X |
| 4,709,965 A | * | 12/1987 | Kazaoka et al. .......... | 297/366 |
| RE32,884 E | * | 3/1989 | Kluting et al. ........... | 297/367 |
| 4,836,608 A | * | 6/1989 | Sugiyama ............... | 297/367 |
| 4,872,726 A | * | 10/1989 | White et al. ............. | 297/367 |
| 4,875,735 A | * | 10/1989 | Moyer et al. ............ | 297/367 |
| 5,138,744 A | * | 8/1992 | Coggon ................. | 16/325 |
| 5,154,476 A | * | 10/1992 | Haider et al. ............ | 297/367 |
| 5,328,241 A | * | 7/1994 | Haider ................. | 297/367 |
| 5,346,281 A | * | 9/1994 | Hughes ................. | 297/367 |
| 5,433,507 A | * | 7/1995 | Chang ................. | 297/367 |
| 5,474,360 A | * | 12/1995 | Chang ................. | 297/367 |
| 5,522,643 A | * | 6/1996 | Matsuura ............... | 297/367 |
| 5,535,640 A | * | 7/1996 | Qiu .................... | 297/367 X |
| 5,588,705 A | * | 12/1996 | Chang ................. | 297/367 |

(List continued on next page.)

FOREIGN PATENT DOCUMENTS

| | | | | | |
|---|---|---|---|---|---|
| DE | 3234305 A1 | * | 3/1983 | ............... | 297/367 |
| DE | 3323539 A1 | * | 1/1985 | ............... | 297/367 |
| DE | 3333056 A1 | * | 3/1985 | ............... | 297/367 |
| EP | 6610 A1 | * | 1/1980 | ............... | 297/367 |
| EP | 7107 A1 | * | 1/1980 | ............... | 297/367 |
| GB | 2085959 A | * | 5/1982 | ............... | 297/367 |
| JP | 53023426 A | * | 3/1978 | ............... | 297/367 |
| JP | 02074427 A | * | 3/1990 | ............... | 297/367 |
| JP | 04008309 A | * | 1/1992 | ............... | 297/367 |
| JP | 04371103 A | * | 12/1992 | ............... | 297/367 |
| JP | 05176819 A | * | 7/1993 | ............... | 297/367 |
| JP | 05337019 A | * | 12/1993 | ............... | 297/367 |
| JP | 06113929 A | * | 4/1994 | ............... | 297/367 |
| JP | 06156128 A | * | 6/1994 | ............... | 297/367 |
| JP | 06189835 A | * | 7/1994 | ............... | 297/367 |
| JP | 06217837 A | * | 8/1994 | ............... | 297/367 |
| WO | WO 9101667 A1 | * | 2/1991 | ............... | 297/367 |

Primary Examiner—Rodney B. White
(74) Attorney, Agent, or Firm—Jon M. Dickinson, P.C.; Robert D. Varitz, P.C.

(57) ABSTRACT

A seat structure with latching-unlatching mechanism for enabling smoothly operating releaseable locking and unlocking actions between a seat-base and an inclinable seat-back hinged to the seat-base in the seat structure. Two interengageable arcs of gear teeth forming part of the mechanism engage and release selectively under rocker-lever seat-occupant control to lock and unlock the seat-back for inclinational fixation and adjustment, and, as determined by tooth-pitch in the arcs, enable positive locking to take place in a large number of specific, small-angular-difference, seat-back inclinations.

8 Claims, 7 Drawing Sheets

U.S. PATENT DOCUMENTS

| | | | |
|---|---|---|---|
| 5,590,932 A | * | 1/1997 | Olivieri ........................ 297/367 |
| 5,622,410 A | * | 4/1997 | Robinson ..................... 297/367 |
| 5,678,895 A | * | 10/1997 | Matsuura et al. ............ 297/367 |
| 5,690,386 A | * | 11/1997 | Chabanne .................... 297/367 |
| 5,702,156 A | * | 12/1997 | Takagi ......................... 297/367 |
| 5,722,730 A | * | 3/1998 | McKernan ................ 297/463.1 |
| 5,733,007 A | * | 3/1998 | Williams ..................... 297/367 |
| 5,733,008 A | * | 3/1998 | Tame ...................... 297/378.11 |
| 5,749,625 A | * | 5/1998 | Robinson ..................... 297/367 |
| 5,934,753 A | * | 8/1999 | Lange .......................... 297/367 |
| 6,139,104 A | * | 10/2000 | Brewer .................... 297/367 X |
| 6,139,105 A | * | 10/2000 | Morgos et al. ......... 297/378.12 |
| 6,209,955 B1 | * | 4/2001 | Seibold ................... 297/216.13 |
| 6,273,508 B1 | * | 8/2001 | Lange .................... 297/378.12 |
| 6,598,938 B2 | * | 7/2003 | Boltze et al. ................ 297/367 |
| 6,659,558 B2 | * | 12/2003 | Sugimoto .................... 297/367 |
| 2002/0008419 A1 | * | 1/2002 | Boltze et al. ................ 297/367 |
| 2002/0043853 A1 | * | 4/2002 | Shephard ..................... 297/367 |
| 2002/0050733 A1 | * | 5/2002 | Hansel et al. ................ 297/367 |
| 2002/0153755 A1 | * | 10/2002 | Sugimoto .................... 297/367 |
| 2003/0025375 A1 | * | 2/2003 | Gray ............................ 297/367 |
| 2003/0042780 A1 | * | 3/2003 | Klein et al. .................. 297/367 |
| 2003/0062755 A1 | * | 4/2003 | Klein et al. .................. 297/367 |
| 2003/0160490 A1 | * | 8/2003 | Nock ........................... 297/367 |

* cited by examiner

FIG.10

# GEAR-LOCK ADJUSTABLE SEAT STRUCTURE

BACKGROUND AND SUMMARY OF THE INVENTION

This invention relates to adjustable seat structure, and more particularly to mechanism for selectively adjusting, and for releasably gear-locking, the inclination of a seat-back sub-structure (seat-back) in relation to a seat-base frame (seat-base) to which the seat-back is pivoted. While the invention has utility in many applications, it is described and illustrated herein in the setting of an aircraft passenger seat—a setting with respect to which its utility has been found to be especially well suited.

As will be seen, the mechanism of this invention includes a unique, combined lever, gear and cam arrangement which operates smoothly, and bi-directionally positively, to free and anchor a seat-back selectively at a plurality of different inclinations relative to the associated seat-base.

According to a preferred and best mode embodiment of the invention which is specifically illustrated and described herein, three spaced, substantially parallel hinge, or pivot, axes play cooperative roles in the structure and operation of the invention. One of these axes (the seat-back rock axis) is that with respect to which the seat-back swings, inclines, rocks, etc., reciprocally relative to the seat-base. A special rocker gear, which possesses an arc of gear teeth, is pivoted on this same axis. The rocker gear is anchored to the seat-back for movement as a unit therewith, and its arc of gear teeth follows a circular, chordal path (approximately 30°) which is radially centered on the seat-back rock axis.

A second axis is one on which a rockable latch element, which also possesses an arc of gear teeth, is pivoted for reciprocal rocking relative to the seat-base. The teeth in this latch element confrontingly face the teeth in the rocker gear, are distributed along a chordal, circular arc (about 20°) which has a radius of curvature substantially the same as that of the arc of teeth in the rocker gear, and, because both sets of teeth have the same (common) tooth-pitch, are freely meshable and de-meshable with the rocker gear teeth. The arc of teeth in the latch element are not fixedly centered on any of the mentioned, three pivot axes. Rather, the teeth in this second-mentioned arc swing, with rocking of the latch element, about the mentioned "second" axis. The latch element, within its perimeter, is formed with a specially shaped void space which functions, as will be explained, to furnish special cam-follower dwell and drive surfaces (structures) that play roles in the operation of the invention.

The third axis defines a rock/pivot axis for a cam, or cam structure, which is specially shaped, and disposed operatively within the latch element's void space for interaction therein with the mentioned cam-follower dwell and drive surfaces. This cam structure is anchored to a rock-axis-sharing elongate shaft which carries, near one (or both of its) end(s), a user (seated person) manipulable lever which is employable to operate the mechanism of the invention. This shaft and lever, per se, are not part of the present invention.

Various other features and advantages of the invention will become more fully apparent as the description which now follows is read in conjunction with the several drawing figures.

DETAILED DESCRIPTION OF THE INVENTION

Figure 1:
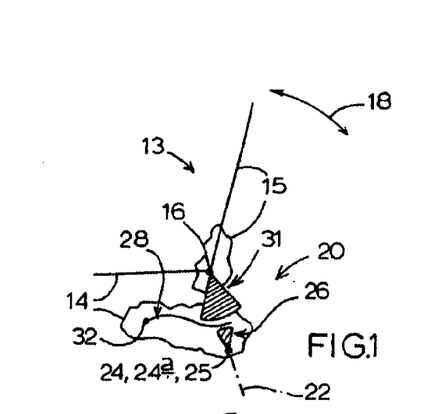
FIGS. 1–3, inclusive, are very simplified, schematic side elevations of an aircraft passenger seat having a seat-base, and pivoted thereto, a reciprocally inclinable seat-back which is pivoted to the seat-base, with this seat employing the preferred and best mode embodiment of the present invention. In solid lines in FIGS. 1 and 2, the seat-back is shown in a fully forward inclination, and in FIG. 3, in a fully rearward inclination. A dash-double-dot line in FIG. 3 helps visually to relate the fully forward and fully rearward inclinations.
Figure 2:
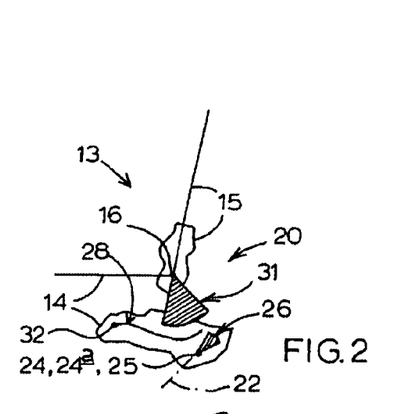
Figure 3:
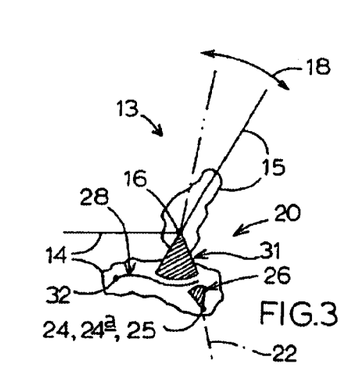

Turning now to the drawings, and referring first of all to FIGS. 1–3, inclusive, indicated generally at 13 is an aircraft passenger seat which includes a seat-base (or seat-base frame structure) 14, and a seat-back (or seat-back structure) 15. The seat-back is pivotally connected to the seat for reciprocal inclination about an axis (which is normally a horizontal axis, and which is also called herein a rock axis) 16, back and forth through a limited angle as indicated by double-headed curved arrow 18 in FIGS. 1 and 3. The specific size for this angle, which is not critical, and as illustrated herein, is about 15°. In seat 13, the operative size of this angle is controlled essentially by the structure of the present invention. This will become clear shortly. Seat-base 14 is appropriately secured to the frame of an aircraft which is not shown in the drawings Indicated generally at 20 is latch-release mechanism, also called a latching-unlatching mechanism, which is constructed in accordance with a preferred and best mode embodiment of the invention. Mechanism 20 is located adjacent one lateral side of seat 13, and this side is referred to hereinafter as the mechanism side of the seat. Mechanism 20 accommodates selective, releasably lockable, reciprocal, angular-positional adjustment of seat-back 15 relative to seat-base 14 through the angle just mentioned above. To effect such an adjustment, a person seated in seat 13 manipulates an exposed rocker lever 22 which is illustrated schematically by a dash-dot, downwardly projecting line in FIGS. 1, 2, and 3. Lever 22 is secured near one end of, and to, an elongate, transverse shaft 24 that is appropriately journaled (or pivoted) on base 14 to turn about an axis 25 which coincides with its own (the shaft's) long axis 24a. Lever 22 is exposed and accessible at one, outer side of seat 13. It is shaft 24, under the control of lever 22, which introduces operative rotation (or rocking) into mechanism 20. With regard to this just-described lever and shaft structure, it should be understood that other specific kinds of structural arrangements may be provided for allowing operation of mechanism 20, and in particular for enabling a seat occupant to introduce rocking rotation into this mechanism.

In the embodiment of mechanism 20 herein illustrated, and now to be described, and including focus now on all of the drawing figures, there are three, principal interactive components (also called rock structures). These include a rocker cam 26 (also called a person-manipulable rocker cam), a latch, or latch element, 28 which includes within its perimeter boundary as can clearly be seen in the FIGS. 4–12, inclusive, a cut-out void space 30 that furnishes internal surfaces 30a, 30b, and 30c that function, as will be explained, as dwell, cam-follower (or cam-follower structure), and drive, surfaces, respectively, and a rocker gear 31. Two other internal surfaces, 30d, 30e, in void space 30 should be mentioned here. Surface 30d forms one "lateral" side of the void space. Surface 30e furnishes herein what is later referred to as a reception surface. Rocker cam 26 includes two angularly opposite "lateral" sides 26a, 26b, and another surface 26c which functions as a dwell surface that cooperates, as will later be explained, with dwell surface 30a in void space 30. Surfaces 30a, 30e are curved, have substantially the same radious of curvature, and are referred to herein as twin, like-radius follower surfaces.

Rocker cam 26, which is suitably joined, as by welding, to that end of shaft 24 which is adjacent the mechanism side of seat 13, is somewhat pie-shaped, with rounded corners. The rocker cam flairs angularly outwardly from shaft 24 along previously mentioned sides 26a, 26b, toward curved dwell surface 26c. Surface 26c herein is a surface of revolution curving about previously mentioned axis 25. The rocker cam is operatively disposed within void space 30.

Latch element 28 has the perimetral shape clearly illustrated for it in the drawings, and includes an extension arm 28a which is pivoted to seat-base 14 for reciprocal rocking about an axis 32. Axis 32 is spaced from, and disposed substantially parallel to, axes 16, 25. The preferred arrangement of these three spaced, generally parallel axes, relative to seat-base 14, is such that axes 25, 32 are below axis 16, with axis 25 being located rearwardly of axis 16, and axis 32 being located forwardly of axis 16.

Formed on the upper side of element 28 is an elongate, circularly-curved arc of teeth 28b. Arc 28b herein subtends an angle of about 15°, and curves about a non-illustrated axis which, because of the rocking capability that is intentionally provided for the latch element, is not fixed relative to seat-base 14. The radius of curvature of arc 28b is made to be substantially the same as the radius for curvature designed for an arc of somewhat similar teeth 31a provided in rocker gear 31. The term "somewhat similar" is employed to describe this arc relationship, inasmuch as arc 28b is concave, and arc 31a is matchingly convex. Arcs of teeth 28b and 31a are also referred to herein as row-sets of teeth.

Reciprocal rocking motions which are permitted interactively between rocker cam 26 and latch 28 are produced by manipulation of lever 22 and shaft 24. These motions are angularly limited, and the angular limit conditions/positions of these two elements can be seen especially well in FIGS. 7 and 11 in the drawings. These motions are independent of the condition/position of rocker gear 31. The limit conditions pictured depend principally on the respective radii of rocking provided for these two mechanism components, and upon the relationship which exists between the perimetral outline of cam 26 and that of void space 30.

How the perimetral configurations of cam 26 and void space 30 specifically relate, in the embodiment of mechanism 20 which is now being described, are hereinbelow now more fully explored.

Figure 7:
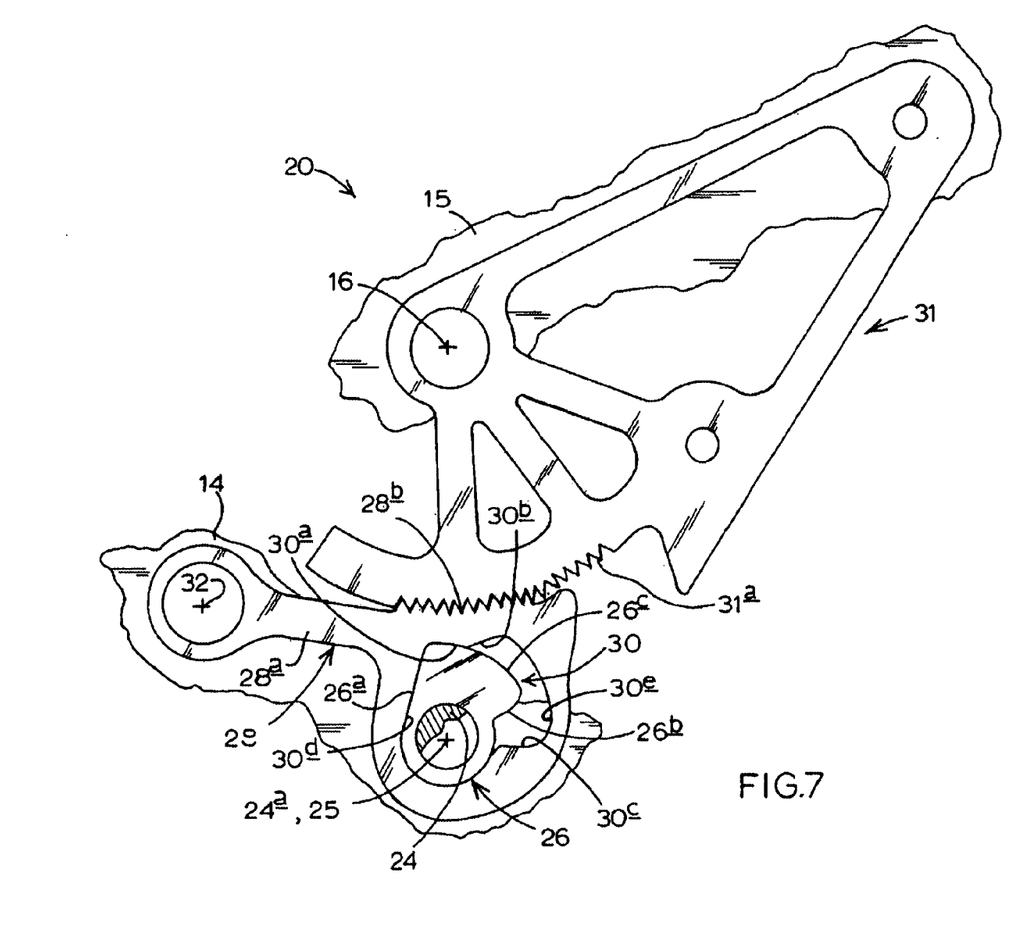
FIGS. 7–11, inclusive, are larger scale views of the adjustment mechanism of the invention illustrating several stages in the operation of this mechanism relating to inclination of the seat-back shown in FIGS. 1, 2 and 3 from a fully forwardly inclined disposition to a fully rearwardly inclined disposition. The views presented in these five figures of the mechanism of the invention have a point of view which is slightly rotated relative to the point of view employed in FIGS. 4–6, inclusive. Specifically the mechanism components shown in FIGS. 7–11, inclusive, are rotated (as a group) clockwise relative to how they appear in FIGS. 4–6, inclusive.
Figure 9:
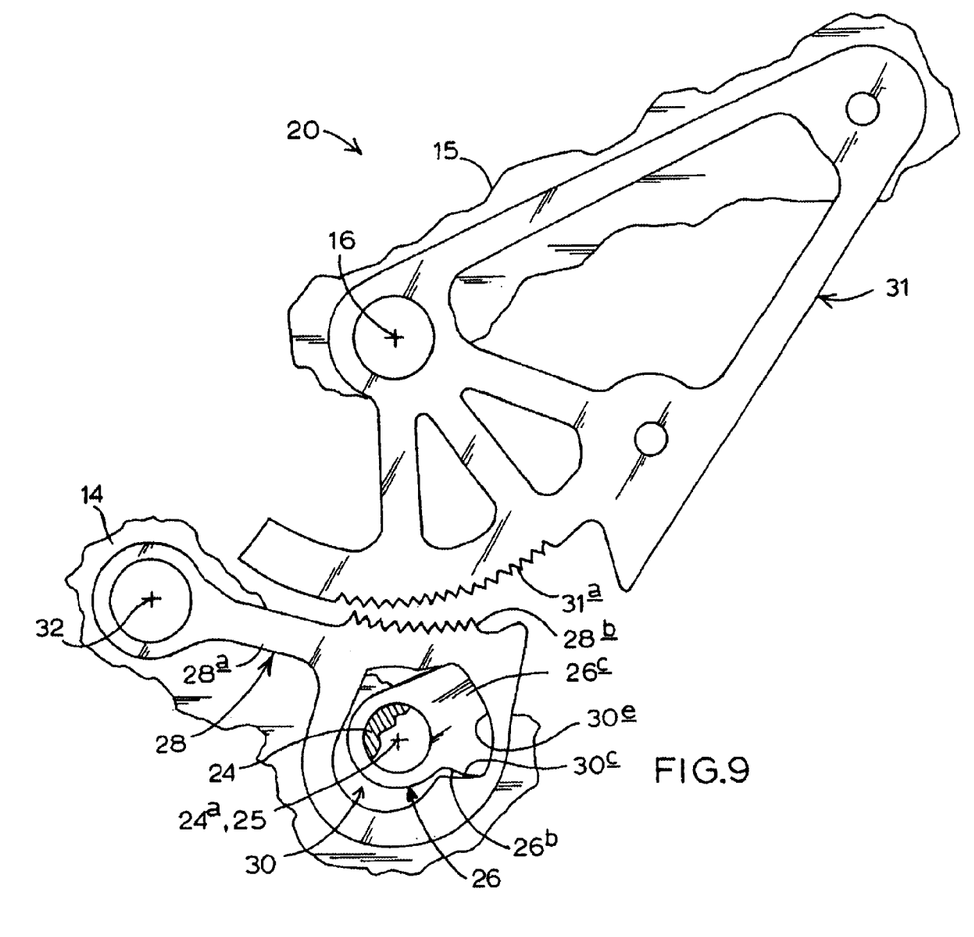

In a reasonable manner of thinking, the perimetral outline of void space 30 can be viewed as resulting from the overlapping, combined, axial foot-printing of the perimetral outline of cam 26 onto the side surface of latch element 28 under the two relative angular limit conditions that are pictured in FIGS. 7 and 9. In the FIG. 7 condition, side 26a in the rocker cam seats substantially matchingly in confronting contact with lateral side surface 30d in void space 30. Dwell surface 26c in the rocker cam seats substantially in matching confronting contact with dwell surface 30a in the void space. Dwell surface 30a has substantially the same radius of curvature as does dwell surface 26c.

In the FIG. 9 conditions, side 26b in the rocker cam seats substantially in confronting abutment with drive surface 30c in void space 30. Dwell surface 26c now substantially seats in matching confronting relationship with similarly curved reception surface 30e in the void space.

How various ones of the specifically identified surfaces in cam 26 and in void space 30 interact during reciprocal operation of mechanism 20 will be discussed shortly.

Rocker gear 31, suitably anchored to function as a unit with seat-back 15 herein, has the shape and configuration clearly pictured in the drawings. Arc 31a of teeth curves about axis 16, and subtends an angle of about 30°.

The teeth in arc 31a are configured to intermesh and lock with the teeth in arc 28b to create a condition referred to herein as compressive engagement between the teeth. Such intermeshing is plainly shown in FIGS. 4 and 6–8, inclusive, and 11 in the drawings. Intermeshing of these two arcs of teeth creates an angular positional lock for seat-back 15, pursuant to operation of the invention. Given the manner in which the opposite ends of arc 31a are structured, the absolute angular limits for relative, intermeshed locking between components 28, 31 is established substantially as the difference in angles that are respectively subtended by arcs 28b, 31a—herein about 15°. Thus it is that mechanism 20 positively establishes the range of "lockable" angular inclining which is permitted seat-back 15 relative to seat-base 14.

Reviewing now the operation of mechanism 20, this will be described with reference to all of the drawing figures. Within these figures, FIGS. 1–3, inclusive, 4–6, inclusive, and 7–11, inclusive, each (group) illustrates the events of unlocking seat-back 15 from seat-base 14, and inclining the seat-back rearwardly from its full forward locked inclination (the condition of mechanism 20 shown in FIGS. 1, 2, 4, 5 and 7–9, inclusive), to its full rearward locked inclination (the condition of mechanism 20 shown in FIGS. 3, 6 and 11). In each of these two seat-back inclination conditions, the cam and cam-follower structures are said to be in opposed-surface locking engagement. Throughout all relative positions between the cam and cam-follower structures, these two structures remain contactively engaged.

Figure 4:
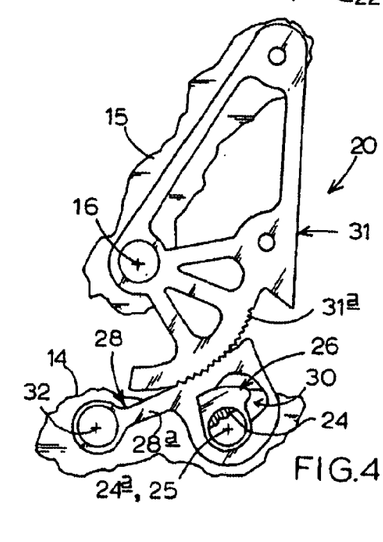
FIGS. 4–6, inclusive, show, on a larger scale, isolated side elevations picturing profile details of the preferred plural-component inclination adjustment mechanism which is constructed in accordance with the invention, and which is employed by the seat shown in FIGS. 1–3, inclusive. The relative positions of these components as they appear in FIGS. 4, 5, and 6, relate to the seat "conditions" illustrated, respectively, in FIGS. 1, 2, and 3.
Figure 5:
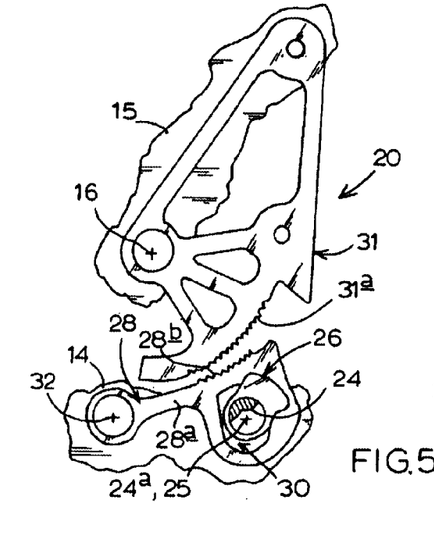
Figure 6:
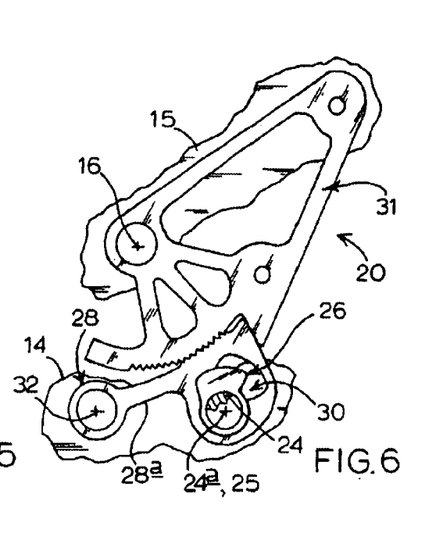

From the condition pictured in FIGS. 1, 4 and 7, a seat occupant manipulates lever 22 to rotate shaft 24 and rocker cam 26 clockwise about coincident axes 24a, 25. Throughout the first roughly 20°'s of such rotation, dwell surfaces 26c, 30a slide past one another, with latch element 28 "dwelling" essentially unmoved (unrocked) from the position in which it is shown in FIGS. 1, 4, 7 and 8. Contact of the dwell surfaces holds latch element 28 in place. This transition is seen especially well in FIGS. 7 and 8.

Figure 8:
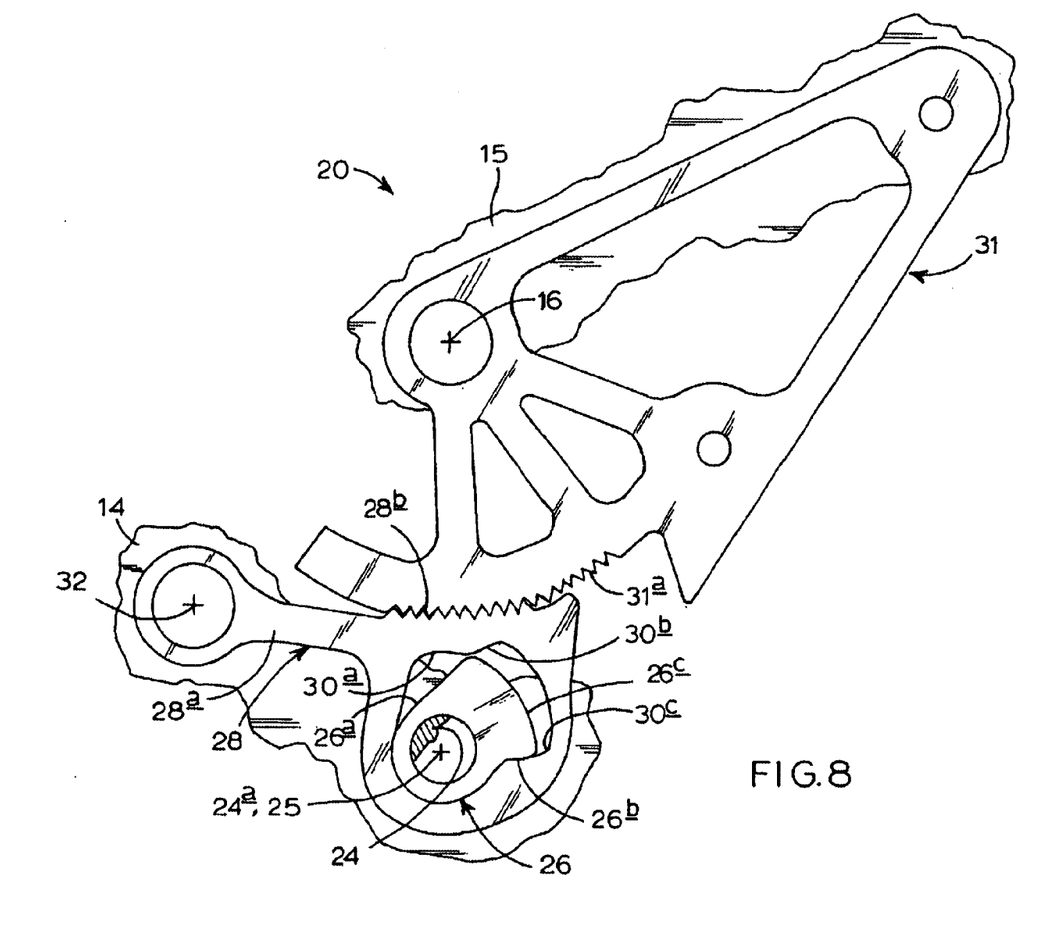

Just as surfaces 26c, 30a "clear" one another, which is the state of things pictured in FIG. 8—a state in which element 28 is no longer held in a fixed, dwell mode by these two surfaces, lateral side surface 26b in the rocker cam engages drive surface 30c in void space 30. Continued clockwise rotation of rocker cam 26, and by means of a driving engagement which now exists between surfaces 26b, 30a, causes driven clockwise rotation (rocking) of latch 28 about axis 32. As this driven rotation occurs, the radiused corner of intersection which exists between surfaces 26a, 26c in the rocker cam skirts in brushing contact substantially continuously along cam-follower surface 30b in void space 30, which cam-follower surface "follows" this radiused corner downwardly because of the rocking action occurring in latch element 28. This action is referred to herein as positive driving disengagement of the two arcs of gear teeth.

There thus exists the very useful condition that the rocker cam and the latch element essentially remain in a kind of positive, co-captured, driver-follower engagement throughout rocking motion.

Rocking continues until the rocking-motion limit condition pictured in FIGS. 2, 5, 9 and 10 occurs, wherein dwell surface 26c closely confrontingly engages reception surface 30e in void space 30. At this point, a limit condition is reached because of the shapes of the interrelated structures of, and the natures of the surface engagements between, the rocker cam and latch element, and as a consequence, the rocker cam and the latch element can no further rotate clockwise about their respective rock axes 25, 32, respectively.

Figure 10:
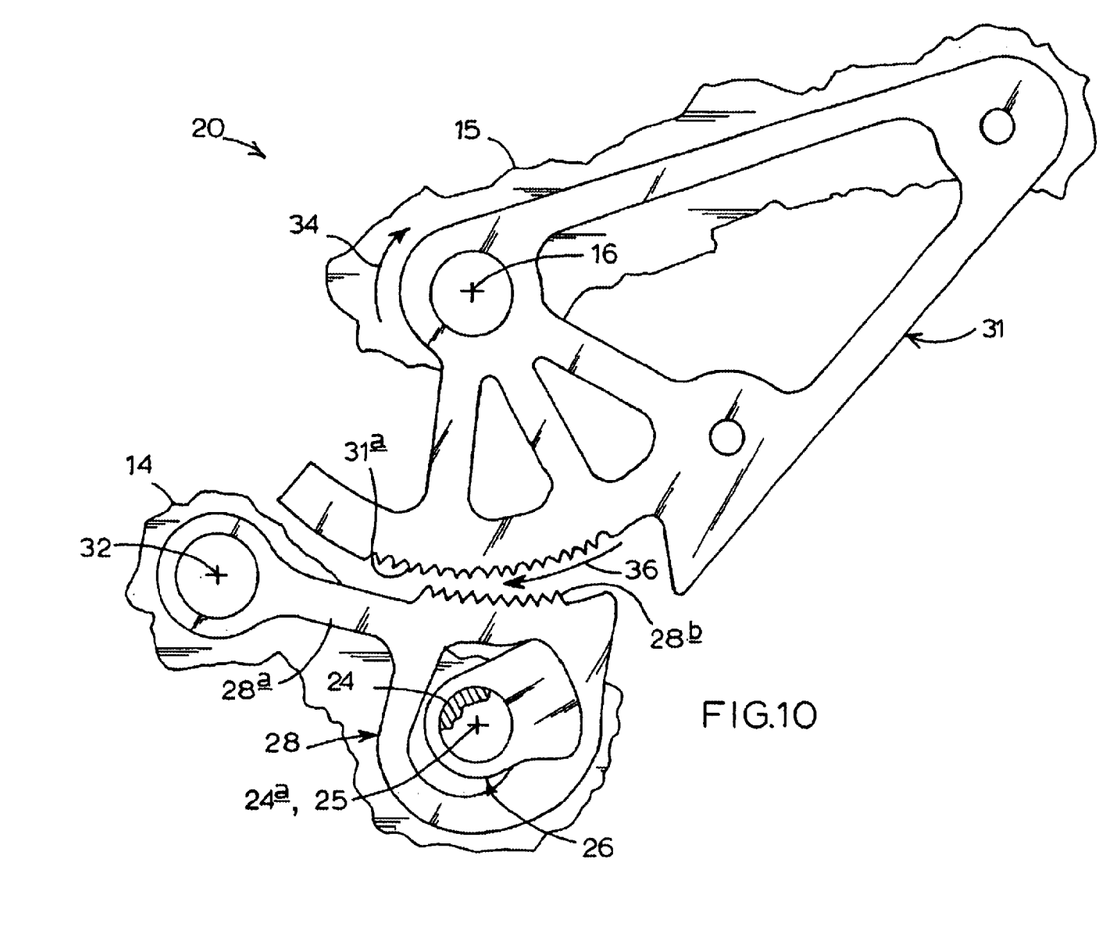
Figure 11:
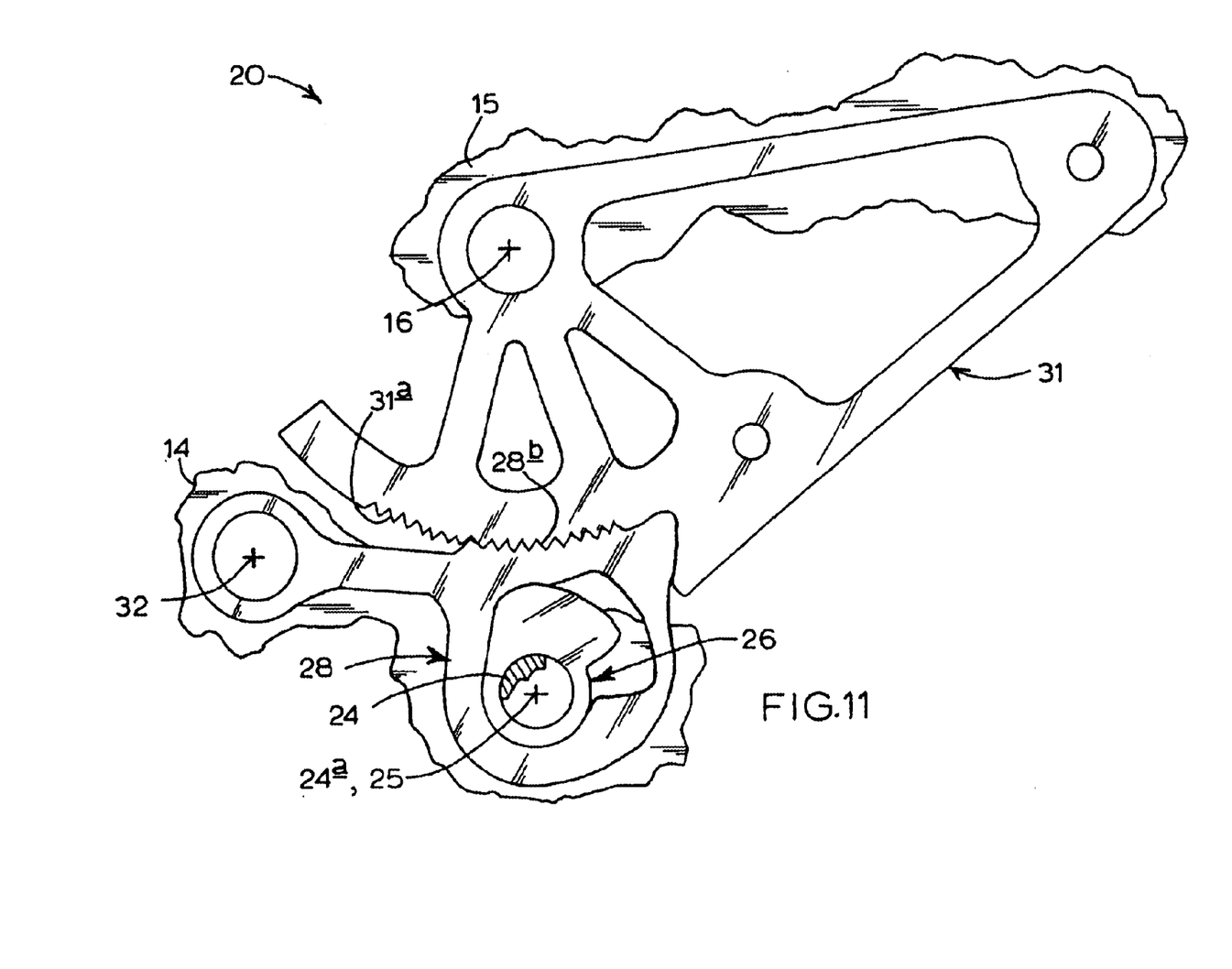
Figure 12:
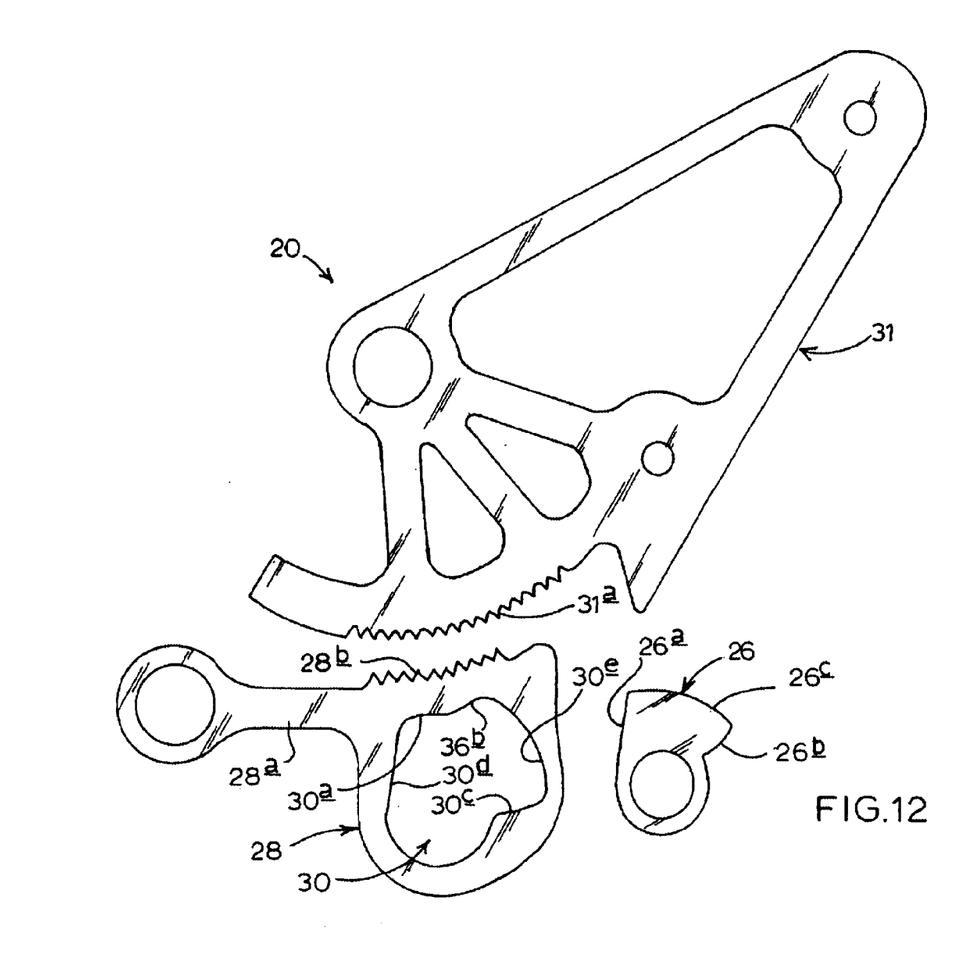
FIG. 12 isolates the several individual components of the adjustment mechanism of this invention.

Under these circumstances, the two arcs of gear teeth are completely disengaged, and seat-back 15 is free to change inclination by rocking clockwise about axis 16 in the figures. FIG. 10 illustrates (by the changed position shown here for rocker gear 31 relative to the position shown for it in FIGS. 1, 4, 5 and 7–9, inclusive, a situation where the seat-back has been inclined rearwardly about half way between its forward and rearward permitted-inclination limits. The direction of clockwise rotational inclining of the seat-back is indicated by arrows 34, 36.

When the seat-back has been adjusted to the inclination desired, and here, a full rearward inclination is being used as an example, the seat occupant again manipulates lever 22, this time to produce counter-clockwise rocking, or rotation, of shaft 24 and rocker cam 26 about axes 24a, 25. This counter, or reciprocal, rocking causes the cam to drive against cam-follower surface 30b to cause lifting, and counter-clockwise-driven rocking about axis 32, of latch element 28, thus to return the latch element to the position shown for it now in FIGS. 3, 6 and 11, but with the arcs of teeth now intermeshing to lock seat-back 15 in its fully rearwardly inclined condition relative to seat-base 14.

Achieving "intermediate" seat-back inclinations is accomplished in a similar manner.

Accordingly, a preferred embodiment of the adjustment mechanism of this invention have been fully described and illustrated herein. This is a mechanism which uniquely enables releasable-locking selectable-inclination between a seat-back and a seat-base. The mechanism illustrated produces very smooth operation, with appropriate positive driving and following and engagements occurring between cam element 26 and latching element 28. The two selectively intermeshable arcs of teeth provided in the mechanism enable secure locking between a seat-back and a seat-base in a large number of different, small-angular-difference inclinations. These different inclinations are, of course, determined by the common tooth-pitch characteristics of the two employed arcs of gear teeth.

Accordingly, while a preferred and best mode embodiment of the invention have been described and illustrated herein, it is appreciated that variations and modifications may be made without departing from the spirit of the invention.

We claim:

1. A latching-unlatching mechanism for accommodating lockable, selective, angular-position adjustment of a seat-back structure, which is mounted, effectively, on a seat-base frame structure for reciprocal rocking relative to such frame structure, throughout a defined angle of adjustment, and about a rock axis comprising a rocker gear anchored for rocking motion as a unit with said seat-back structure about the rock axis, including a row-set arc of teeth radially centered on the rock axis, a latch element mounted on the seat base frame structure adjacent said rocker gear for rocking motion which is relative both to the seat-base frame structure, and to the seat-back structure, about an axis which is spaced from and generally parallel to the rock axis, said latch element including a row-set of teeth disposed in an arc having substantially the same radius of curvature as does the arc of teeth in said rocker gear, said two row-sets of teeth being disengageably meshable, meshing of said teeth locking said rocker gear, and thereby the seat-back structure, against rocking motion, and de-meshing of the teeth enabling such rocking motion, cam-follower structure formed on said latch element, and a person-manipulable rocker cam mounted on said seat-base frame structure for counter-rotation relative to said seat-base frame structure, rocker gear, and latch element, and about an axis which is spaced from, and generally parallel to, said two, earlier-mentioned axes, contactively inter-engaged with said cam-follower structure, manipulable to one position enabling disengagement of said two row-sets of teeth, and to another position involving cam driving of said latch element by said rocker cam wherein said row-sets of teeth are engaged.

2. The mechanism of claim 1 which is constructed in such a manner that there is no independent relative motion that is permitted between said rocker gear and said latch element.

3. The mechanism of claim 1 wherein said row-sets of teeth are constructed in a manner whereby meshing and locking produced thereof and thereby includes the presence of compressive inter-engagement between the teeth in the two row-sets.

4. The mechanism of claim 1 which is structured in such a manner that the manipulation of said person-manipulable rocker cam to produce disengagement of said two row-sets of teeth takes the form of a positive driving disengagement.

5. The mechanism of claim 1 wherein the structural relationship between said latch element, said rocker cam, and said rocker cam is such that said rocker cam positively locks said latch element against inadvertent motion in each of said two positions identified for said rocker cam.

6. The mechanism of claim 5 wherein the locking mentioned therein takes the form of opposed-surface-engagement locking.

7. The mechanism of claim 1 wherein unlatching involves positive drive between the rocker gear and the latch element, and latching involves camming drive between these same two components.

8. The mechanism of claim 1 wherein said cam-follower structure is formed with twin like-radius curved surfaces joined by an intermediate flat surface.

* * * * *